United States Patent
Chen et al.

(10) Patent No.: US 10,826,393 B2
(45) Date of Patent: Nov. 3, 2020

(54) SYSTEMS AND METHODS FOR CONTROLLING DC-DC CONVERTERS USING PARTIAL RESETS

(71) Applicant: MediaTek Inc., Hsin-Chu (TW)

(72) Inventors: Yueh-Min Chen, Hsin-Chu (TW); Yu-Hsin Lin, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/100,070

(22) Filed: Aug. 9, 2018

(65) Prior Publication Data

US 2019/0229620 A1  Jul. 25, 2019

Related U.S. Application Data

(60) Provisional application No. 62/620,533, filed on Jan. 23, 2018.

(51) Int. Cl.
*H02M 3/158* (2006.01)
*H02M 3/07* (2006.01)
(Continued)

(52) U.S. Cl.
CPC ............ *H02M 3/158* (2013.01); *H02M 1/08* (2013.01); *H02M 3/07* (2013.01); *H02M 3/156* (2013.01); *H02M 2001/0025* (2013.01)

(58) Field of Classification Search
CPC ............ H02M 3/00; H02M 3/02; H02M 3/04; H02M 3/06; H02M 3/07; H02M 3/073;
(Continued)

(56) References Cited

U.S. PATENT DOCUMENTS 7,511,472 B1 * 3/2009 Xia ................... G01R 21/133
                                                        323/282
8,305,065 B2 * 11/2012 Sase .................... H02M 3/156
                                                        323/283
(Continued)

FOREIGN PATENT DOCUMENTS

CN    102216695 A    10/2011
CN    104052315 A    9/2014
(Continued)

OTHER PUBLICATIONS

Lee et al., A 0.518mm2 Quasi-Current-Mode Hysteretic Buck DC-DC Converter with 3 µs Load Transient Response in 0.35 µm BCDMOS. 2015 IEEE International Solid-State Circuits Conference. ISSCC 2015; Session 12; Inductor-Based Power Conversion; 3pp.

(Continued)

*Primary Examiner* — Thienvu V Tran
*Assistant Examiner* — Carlos O Rivera-Perez
(74) *Attorney, Agent, or Firm* — Wolf, Greenfield & Sacks, P.C.

(57) ABSTRACT

Direct current-direct current (DC-DC) converters including buck converters are described. These DC-DC converters may be configured to reduce oscillations that would otherwise arise in the output reference voltage due to ringing effects without significantly lengthening the duration of the transient period. These DC converters may leverage a feedback voltage generated by sensing the current flowing through the inductor of the buck converter. The feedback voltage may compared to a threshold, and the signal resulting from the comparison may be used to vary the reference voltage. The DC-DC converter may be operated in a "partial reset mode," in which the voltage generated by sensing the inductor's current is reduced to a value greater than zero in response to the feedback voltage reaching the threshold.

(Continued)

Reducing the sense voltage in this manner may reduce the duration of the transient period.

21 Claims, 4 Drawing Sheets

(51) Int. Cl.
  *H02M 1/08* (2006.01)
  *H02M 3/156* (2006.01)
  *H02M 1/00* (2006.01)

(58) Field of Classification Search
  CPC ........ H02M 3/10; H02M 3/145; H02M 3/155;
       H02M 3/156; H02M 3/157; H02M 3/158;
       H02M 3/1584; H02M 1/08; H02M 1/14;
       H02M 2001/0009; H02M 2001/0016;
       H02M 2001/0019; H02M 2001/0025;
       H02M 2001/0038; H02M 2003/077;
       H02M 2003/1566; H02M 1/083; H02M
       1/088; H02M 1/12; H02M 1/126; H02M
       1/143; H02M 1/15; H02M 3/1588; H02M
       2001/0064; H02M 2001/123; H02M
       2001/4291; H02M 2003/1552

USPC .................. 363/45, 46, 74–79, 123, 124;
                              323/271–278, 280, 282–286, 351
  See application file for complete search history.

(56) References Cited

U.S. PATENT DOCUMENTS

| | | | |
|---|---|---|---|
| 9,653,991 B2 * | 5/2017 | Lee | ........................ H02M 3/156 |
| 9,995,778 B1 * | 6/2018 | Fiori, Jr. | ............ G01R 27/2605 |

FOREIGN PATENT DOCUMENTS

| | | |
|---|---|---|
| CN | 104980020 A | 10/2015 |
| TW | 2013005767 A | 2/2013 |
| TW | 2016102592 A | 1/2016 |
| TW | M523138 U | 6/2016 |

OTHER PUBLICATIONS

Lee et al., A 0.518mm2 Quasi-Current-Mode Hysteretic Buck DC-DC Converter with 3 µs Transient Response in 0.35 µm BCDMOS, presented at the 2015 IEEE International Solid-State Circuits Conference, Feb. 22-26, 2015, Session 12.1, 31 pages.

* cited by examiner

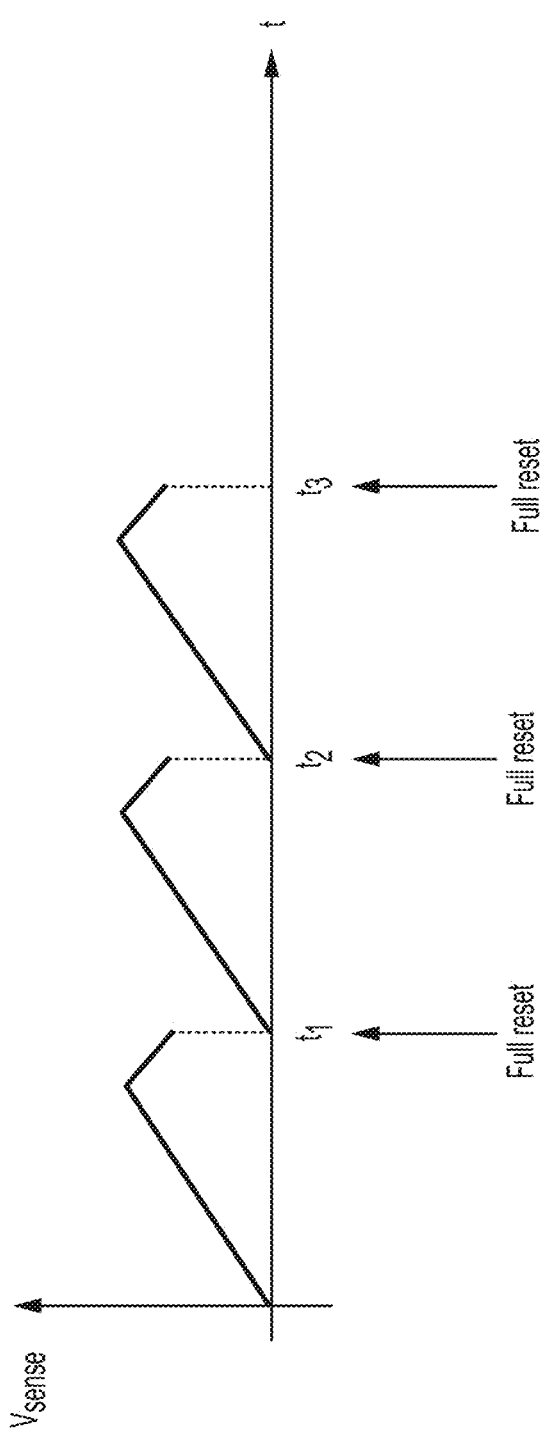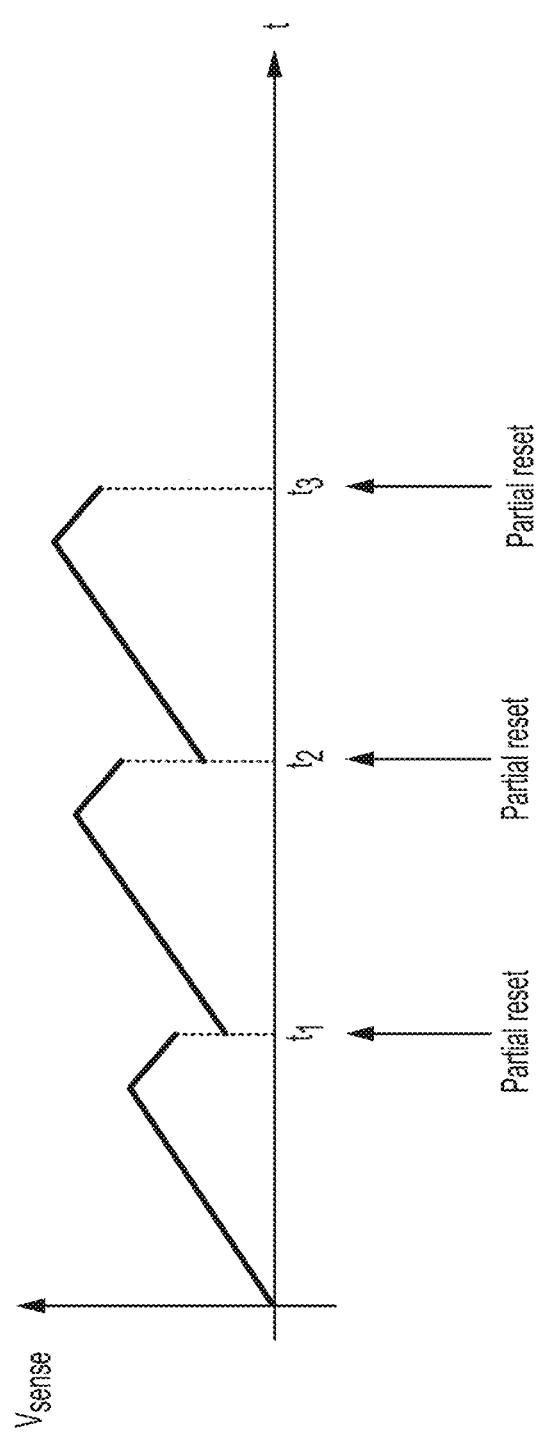

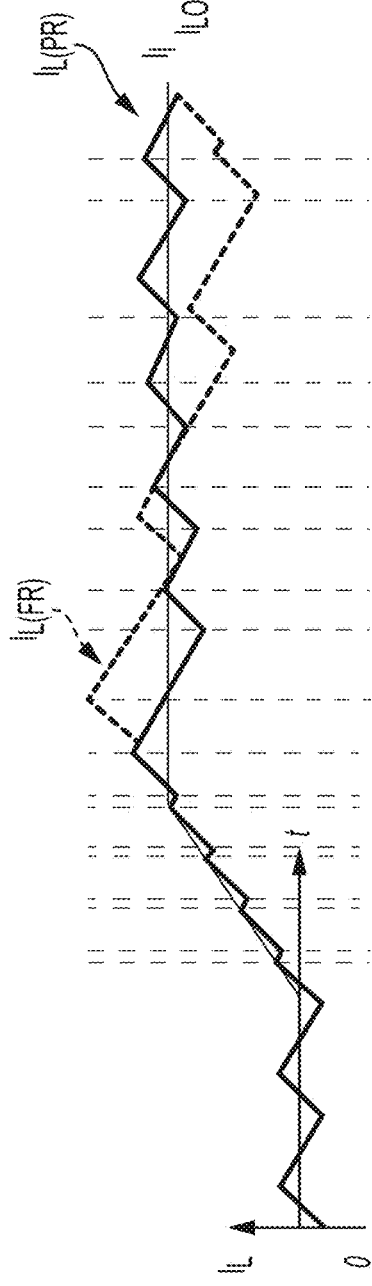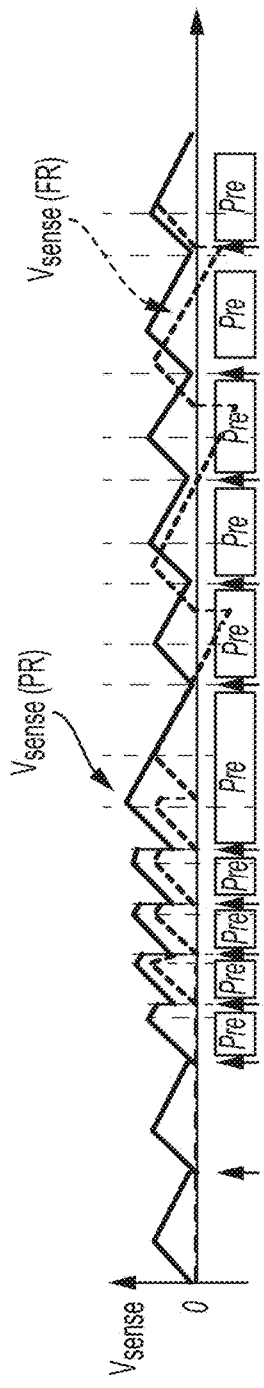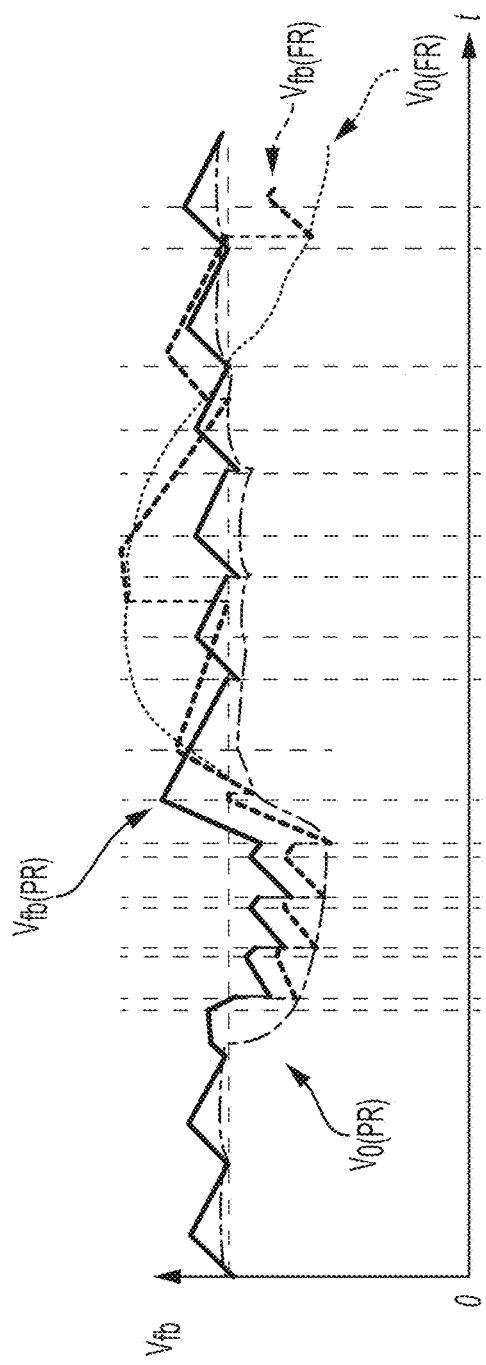

ated that the oscillations may be reduced by maintaining the absolute value of the feedback voltage within a certain predefined range, such that when the feedback voltage reaches the edge of the range a reset event is triggered.

SYSTEMS AND METHODS FOR CONTROLLING DC-DC CONVERTERS USING PARTIAL RESETS

This Application claims priority under 35 U.S.C. § 119(e) to U.S. Provisional Application Ser. No. 62/620,533, entitled "COT WITH PARTIAL RESET" filed on Jan. 23, 2018, which is herein incorporated by reference in its entirety.

BACKGROUND

DC-DC converters are often used in electronic circuits to convert a source of direct current (DC) from one voltage level to another.

BRIEF SUMMARY

Some embodiments relate to a method for controlling a reference voltage. The method may comprise generating the reference voltage with a buck converter; sensing a reference current flowing through the buck converter by generating a sense voltage; generating a feedback voltage based on the reference voltage and the sense voltage; determining whether the feedback voltage has reached a threshold voltage; and in response to determining that the feedback voltage has reached the threshold voltage, varying the reference voltage at least in part by reducing an absolute value of the sense voltage to a value different than zero.

Some embodiments relate to a DC-DC converter comprising a buck converter configured to generate a reference voltage; and control circuitry configured to: sense a reference current flowing through the buck converter by generating a sense voltage; generate a feedback voltage based on the reference voltage and the sense voltage; determine whether the feedback voltage has reached a threshold voltage; and in response to determining that the feedback voltage has reached the threshold voltage, vary the reference voltage in least in part by reducing an absolute value of the sense voltage to a value different from zero.

Some embodiments relate to a DC-DC converter comprising: a buck converter; a first capacitor coupled to the buck converter; a second capacitor coupled to the first capacitor through a switch; a comparator comprising: a first input terminal configured to receive a threshold voltage; a second input terminal coupled to the first capacitor; and an output terminal; and reset circuitry coupled to the output terminal of the comparator and to the switch.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

FIG. 2A is a plot illustrating an example of how a sense voltage may respond to full reset events, according to some non-limiting embodiments.

FIG. 2B is a plot illustrating an example of how a sense voltage may respond to partial reset events, according to some non-limiting embodiments.

FIG. 3A is plot illustrating an example of an inductor current, according to some non-limiting embodiments.

FIG. 3B is plot illustrating an example of a sense current associated to the inductor current of FIG. 3A, according to some non-limiting embodiments.

FIG. 3C is plot illustrating an example of a feedback voltage associated to the inductor current of FIG. 3A, according to some non-limiting embodiments.

DETAILED DESCRIPTION

Figure 1:
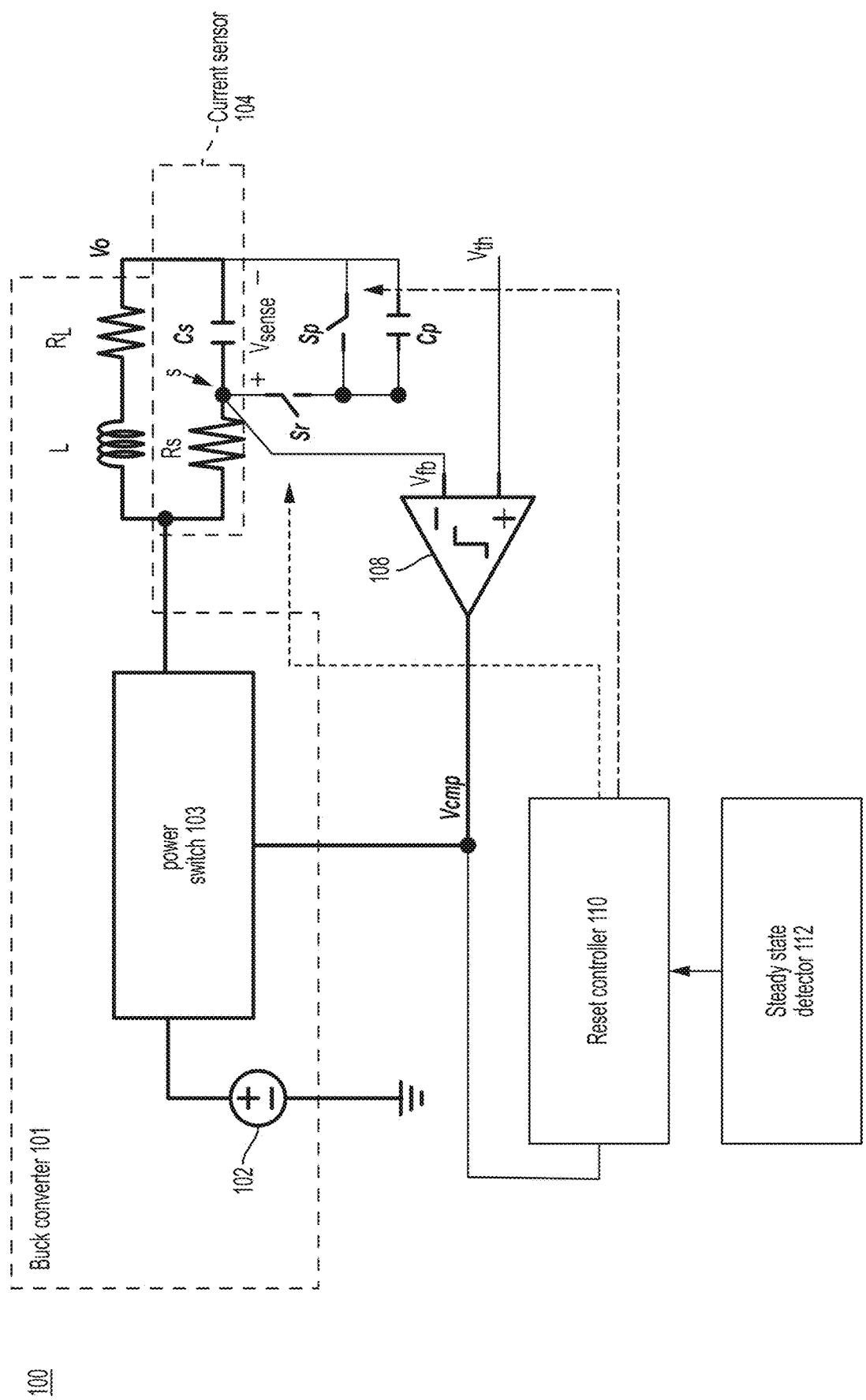
FIG. 1 is a block diagram illustrating schematically an example of a direct current-direct current (DC-DC) converter, according to some non-limiting embodiments.

DC-DC converters are often used in electronic devices, including portable electronic devices such as smartphones, tablets, and laptop computers, which are primarily powered by batteries. Such electronic devices typically include several sub-systems, each having a voltage level requirement different from that supplied by the batteries and often different from the other sub-systems.

Buck converters are a specific class of DC-DC converters that convert a source of direct current (DC) from one voltage level to another by storing the input energy periodically, typically using an inductor, and then releasing the energy to the output at a different voltage. Compared to linear DC-DC converters, buck converters are significantly more energy efficient and compact.

However, buck converters suffer from ringing effects due to underdamping, whereby the output voltage oscillates for a certain period of time before the desired level is reached. These oscillations are caused by the fact that the buck converter is periodically switched between the on-state and the off-state, thus giving rise to accumulation and release of energy in a periodic fashion. These oscillations are inherent to the use of buck converters due to the switching nature of these circuits, and can delay or otherwise negatively affect the operations of the sub-system receiving the converted voltage.

Some control circuits for buck converters exist that limit the oscillations caused by ringing effects. These circuits, however, have significant trade-offs. For example, these circuits can reduce the amplitude of the oscillations, but at the expenses of a longer transient period in which the voltage gradually transitions to the desired level. The DC-DC converters developed by the inventors enable a reduction in the amplitude of the oscillations caused by ringing effects while at the same reducing the duration of the transient period.

The inventors have appreciated that such reductions of the oscillations may be obtained by 1) monitoring the extent to which the current flowing through the buck converter varies over time to generate a sense voltage, 2) generating a feedback voltage using the sense voltage, and 3) varying the buck converter's output voltage based on the value of the feedback voltage. In particular, the inventors have appreciated that the oscillations may be reduced by maintaining the absolute value of the feedback voltage within a certain predefined range, such that when the feedback voltage reaches the edge of the range a reset event is triggered.

In some circumstances, the circuit may be operated in the "full reset mode," whereby the reset event reduces the sense voltage to zero. Resetting the sense voltage to zero limits the amplitude of the feedback voltage, which in turn limits the oscillation in the reference voltage output by the converter. However, resetting the sense voltage to zero may lengthen the duration of the transient period. In other circumstances, the circuit may be operated in the "partial reset mode," whereby the reset event reduces the absolute value of the sense voltage to a fraction of its pre-reset value, the resulting value being different than zero. Resetting the sense voltage in this way allows the sense signal to track variations in the inductor's current more quickly, which in turn may limit the duration of the transient period.

FIG. 1 is a block diagram illustrating a DC-DC converter, in accordance with some embodiments. DC-DC converter 100 includes buck converter 101 and circuitry for controlling the operations of buck converter 101. The control circuitry may be arranged for example to reduce ringing effects or other types of ripples that may otherwise arise in the voltage output by buck converter 101 while limiting the duration of the transient period.

Buck converter 101 may include DC voltage generator 102, power switch 103, inductor L and resistor $R_L$ (which may represent a physical resistor and/or the internal resistance of inductor L). Buck converter 101 may configured to convert the DC voltage provided by DC voltage generator 102 to a different (e.g., lower) level. In some embodiments, power switch 103 may include a controllable switch, which may be implemented using one or more transistors. The state of the switch (e.g., opened or closed) may be controlled based on the output of comparator 108, as will be described further below.

The current flowing through inductor L may be controlled by setting the switch on and off. When the switch is first closed (on-state), the current through inductor L may in response increase. As a result, an opposing voltage across the terminals of inductor L is generated. This voltage across the terminals of inductor L may counteract the voltage provided by DC voltage generator 102, and may reduce the net output voltage ($V_O$). Over time, the extent to which inductor's L current varies may decrease, thus leading to a decrease in the voltage across inductor L's terminals. As a result, voltage $V_O$ increases. During this time, inductor L stores energy in the form of a magnetic field.

When the switch is opened (off-state), DC voltage source 102 is decoupled from inductor L, and inductor L's current decreases. The decreasing current may produce a voltage drop across the terminals of inductor L (opposite to the drop at on-state). At this stage, inductor L effectively operates as a current source. The energy stored in the inductor's magnetic field supports the current flow through the load. This current, flowing while DC voltage generator 102 is decoupled, may be greater than the average input current output by DC voltage generator 102. This average current increase results in an average voltage decrease at the output ($V_O$) relative to the voltage of DC voltage generator 102. In this way, the power provided by DC voltage generator 102 is substantially maintained at the output, and the output voltage ($V_O$) is reduced.

It should be appreciated that while the example described above is such that the output voltage is less than the input voltage, DC-DC converter 100 may also be operated such that the output voltage is greater than the input voltage. Output voltage $V_O$ is also referred to herein as the "reference voltage"

In some embodiments, the reference voltage output by buck converter 101 may be controlled to reduce or eliminate oscillations and/or other types of ripples that may otherwise arise, for example due to ringing effects. Control of the reference voltage may be performed, in some embodiments, by monitoring the current flowing through inductor L and by adjusting the state of the power switch 103 accordingly.

In some embodiments, a current sensor 104 may be used to sense the current flowing through inductor L. For example, the current sensor may be configured to output a sense voltage indicative of inductor L's current. The voltage may be proportional to inductor L's current, proportional to the integral of inductor L's current, or proportional to the derivative of inductor L's current, among other possibilities. In the example of FIG. 1, current sensor 104 is implemented using resistor $R_S$ and capacitor $C_S$. The voltage at the terminal of capacitor $C_S$, $V_{sense}$, may be indicative of inductor L's current. It should be appreciate that different current sensors may be used in other embodiments to generate sense voltage $V_{sense}$, including for example a trans-impedance amplifier or trans-conductance amplifier.

In some embodiments, a feedback voltage $V_{fb}$ may be generated based on $V_{sense}$ and $V_O$, and may be used to vary the reference voltage $V_O$ based on the current sensed by the current sensor. In the example of FIG. 1, the feedback voltage is the voltage at node s, and is such that $V_{fb}=V_{sense}+V_O$. Comparison voltage $C_{cmp}$ may be generated by comparing, with comparator 108, feedback voltage $V_{fb}$ with threshold voltage $V_{th}$. In some embodiments, $C_{cmp}$ may have one value when $V_{fb}>V_{th}$ and may have another value when $V_{fb}<V_{th}$. In other embodiments, however, comparator 108 may be hysteretic. In such embodiments, $V_{fb}$ may be compared with $V_{th}+V_{hist}$ when $V_{fb}$ is increasing and may be compared with $V_{th}-V_{hist}$ when $V_{fb}$ is decreasing, where $V_{hist}$ may be greater or less than zero.

It should be appreciated that the threshold value, whether $V_{th}$, $V_{th}-V_{hist}$, or $V_{th}+V_{hist}$, may be set to make the compensation circuit more or less sensitive to oscillations in the current flowing through inductor L. Setting the threshold to a low level (e.g., less than 0.5V) may be effective at reducing even very small oscillations, but may result in a long transient period before reference voltage $V_O$ reaches the desired level. Setting the threshold to a higher level may shorten the transient period, but in this way smaller oscillations may remain uncompensated.

In some embodiments, comparison voltage $V_{cmp}$ may be used to control the state of the power switch 103. In some embodiments, $V_{cmp}$ may determine whether the switch is opened or closed. In this way, the reference voltage $V_O$ may be varied depending on whether the feedback voltage reaches the threshold. For example, when $V_{fb}$ reaches the threshold value, $V_{cmp}$ may cause the switch to be opened, which may result in a reduction in $V_O$. If $V_{fb}$ is different than the threshold value, $V_{cmp}$ may be such that the switch is closed, which may result in an increase in $V_O$.

To further reduce oscillations in the reference voltage $V_O$ without necessarily lengthening the duration of the transient period, in some embodiments, sense voltage $V_{sense}$ may be reduced (in absolute value), responsive to the feedback voltage $V_{fb}$ reaching the threshold. In some embodiments, sense voltage $V_{sense}$ may be set to zero responsive to $V_{fb}$ reaching the threshold. This arrangement is referred to as the "full reset mode." An example of how $V_{sense}$ may be varied in the full reset mode is illustrated in FIG. 2A, which plots $V_{sense}$ of a function of time. In this examples, three "full reset" events occur at t=$t_1$, t=$t_2$, and t=$t_3$, respectively. Each full reset event occurs because $V_{fb}$ has reached the threshold. As illustrated, responsive to a full reset event, $V_{sense}$ is set to zero.

Setting $V_{sense}$ to zero as shown in FIG. 2A may effectively reduce the oscillations in the reference voltage $V_O$, but may lengthen the duration of the transient period because of the additional time lapsed before $V_{sense}$ can again track the inductor's current once it has been set to zero. To reduce the additional time lapsed before $V_{sense}$ can track the inductor's current, partial resets rather than full resets may be performed. This arrangement is referred to as the "partial reset mode." When a partial reset is commanded in response to $V_{fb}$ reaching the threshold, $V_{sense}$ may be reduced, in absolute value, to a value greater than zero. For example, a partial reset event may reduce the absolute value of $V_{sense}$ by ½, ⅓, ¼, ⅕, ⅔, ¾, ⅘, among other possible values, or by a value that is between 0.1 and 0.9, between 0.2 and 0.8, between 0.3 and 0.7, between 0.4 and 0.6, between 0.55 and 0.45 or between 0.49 and 0.51, among other possible ranges.

An example of how $V_{sense}$ may be varied in the partial reset mode is illustrated in FIG. 2B. In this examples, three "partial reset" events occur at $t=t_1$, $t=t_2$, and $t=t_3$, respectively. Each partial reset event occurs because $V_{fb}$ has reached the threshold. As illustrated, in this example, responsive to a full reset event, $V_{sense}$ is reduced by approximately ½ of its pre-reset value. It should be observed that, unlike the example of FIG. 2A in which the voltage always restarts from zero, in this case the voltage restarts from the partially reset value. As will be discussed further below, restarting the voltage from the partially reset value rather than from zero may reduce the duration of the transient time.

Referring back to FIG. 1, reset controller 110 may be used to reset $V_{sense}$, partially or fully. In the partial reset mode, reset controller 110 may be configured such that, when $V_{fb}$ reaches the threshold, part of the electric charge stored in the capacitor $C_s$ is redistributed to capacitor $C_p$. As a result, $V_{sense}$ is reduced by a factor that depends on $C_s/(C_s+C_p)$. For example, if $C_s=C_p$, $V_{sense}$ is reduced by ½. The charge redistribution may be accomplished, in some embodiments, by closing switch $S_r$, which in this case is connected between $C_5$ and $C_p$. Reset controller 110 may control the state of switch $S_r$ depending on $V_{cmp}$.

In the full reset mode, reset controller 110 may be used to set $V_{sense}$ to zero. For example, reset controller 110 may configured to close switch $S_p$ responsive to $V_{fb}$ reaching the threshold. When switch $S_p$ (connected in parallel to capacitor $C_5$ in this example) is closed, capacitor $C_5$ is shorted thus forcing the voltage across its terminals to zero.

In some embodiments, DC-DC converter 100 may be operated in the partial reset mode during certain periods of time, and may be operated in the full reset mode during other periods of time. For example, DC-DC converter 100 may be operated in the partial reset mode in the transient period, when reference voltage $V_0$ is transitioning to the desired value, and may be operated in the full reset mode at steady state, when reference voltage $V_0$ has reached the desired value. Steady state detector 112 may be used to determine whether DC-DC converter 100 is in the transient period or is at steady state. Steady state detector 112 may, for example, compare reference voltage $V_0$ to a predefined value. If it is determined that reference voltage $V_0$ is within a certain range of the predefined value, steady state detector 112 may control reset controller 110 to operate in the full reset mode. Otherwise, steady state detector 112 may control reset controller 110 to operate in the partial reset mode.

FIGS. 3A, 3B and 3C illustrate examples of how inductor L's current ($I_L$), $V_{sense}$, $V_{fb}$ and $V_0$ may be varied in the full reset mode and in the partial reset mode, in accordance with some embodiments. As shown in FIG. 3A, in this case, $I_L$ initially has an average value equal to the current of DC voltage generator 102 ($I_{SOURCE}$). Subsequently, $I_L$ transitions from an average value of $I_{SOURCE}$ to an average value of $I_{LOAD}$. Because $I_{LOAD}$ is greater than $I_{SOURCE}$, the output voltage $V_0$ at steady state is less than the voltage of DC voltage generator 102. As illustrated, $I_L$ experiences oscillations (linear oscillations in this example) due to ringing effects. $I_{L(FR)}$ represents inductor L's current when DC converter 100 is operated in the full reset mode and $I_{L(PR)}$ represents inductor L's current when DC converter 100 is operated in the partial reset mode.

Similarly, $V_{sense(FR)}$ represents the sense voltage when DC converter 100 is operated in the full reset mode and $V_{sense(PR)}$ represents the sense voltage when DC converter 100 is operated in the partial reset mode (see FIG. 3B). As illustrated, $V_{sense(FR)}$ is set to zero following each reset event (indicated by arrows positioned under the time axis). By contrast, $V_{sense(PR)}$ is set to a fraction of the pre-reset value following each reset event. The result is that $V_{sense(PR)}$ can track variations in $I_L$ more quickly relative to $V_{sense(FR)}$.

$V_{fb(FR)}$ represents the feedback voltage when DC converter 100 is operated in the full reset mode and $V_{fb(PR)}$ represents the feedback voltage when DC converter 100 is operated in the partial reset mode (see FIG. 3C). Also shown in FIG. 3C are the reference voltage when operated in the full reset mode ($V_{0(FR)}$) and the reference voltage when operated in the partial reset mode ($V_{0(PR)}$).

In this case, the amplitude of the oscillations experienced by $V_{fb}$ in the partial reset mode is generally less than the amplitude of the oscillations experienced by $V_{fb}$ in the full reset mode. This may result in a) the amplitude of the oscillations experienced by $I_L$ in the partial reset mode being generally less than the amplitude of the oscillations experienced by $I_L$ in the full reset mode, and b) $I_L$ in the partial reset mode reaching steady-state sooner than $I_L$ in the full reset mode. This, in turn, results in $V_0$ in the partial reset mode having oscillations than are lower in amplitude than $V_0$ in the full reset mode, and reaching steady-state sooner than $V_0$ in the full reset mode.

Figure 4:
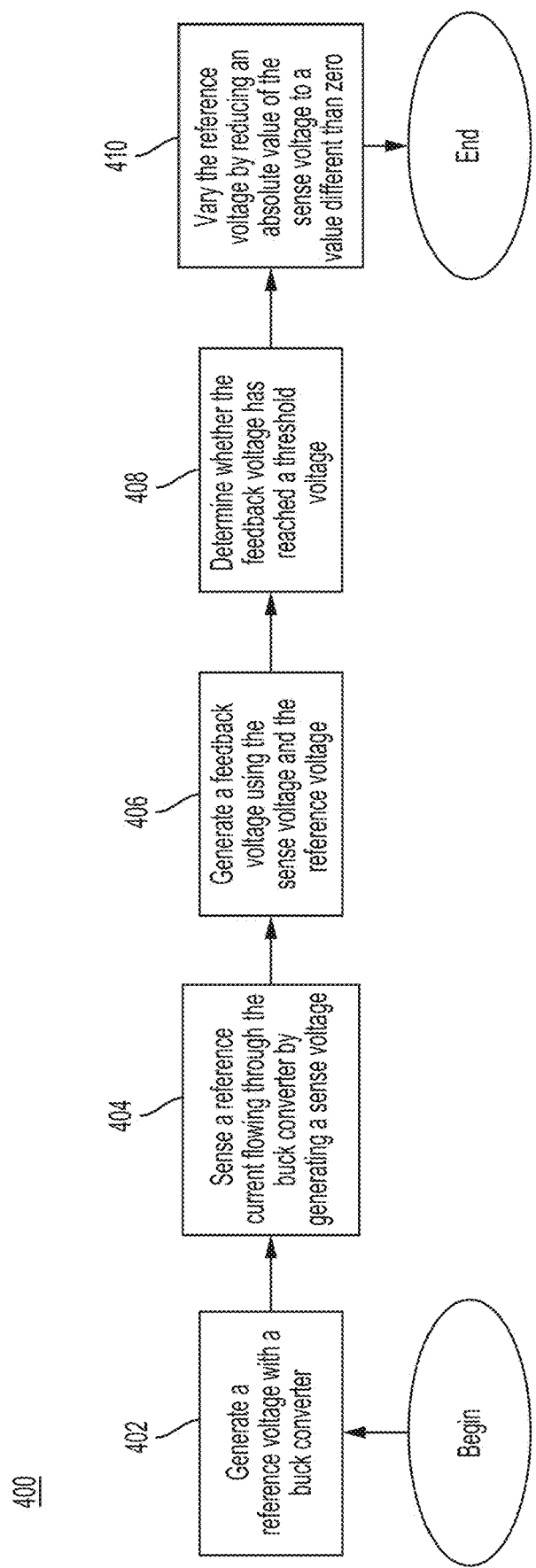
FIG. 4 is a flowchart illustrating a method for controlling a reference voltage using a DC-DC converter, according to some non-limiting embodiments.

FIG. 4 is a flowchart illustrating an example of a method for controlling the reference voltage output by a buck converter, in accordance with some embodiments. The reference voltage may be controlled, for example, to reduce oscillations arising due to ringing effects without significantly increasing the duration of the transient period.

Method 400 begins at act 402, in which a reference voltage is generated using a buck converter. For example, reference voltage $V_0$ may be generated using buck converter 101. At act 404, a reference current flowing through the buck converter (e.g., through an inductor of the buck converter) may be sensed using a current sensor. A sense voltage indicative of the buck converter's current may be generated. For example, resistor $R_s$ and capacitor $C_s$ may be used to sense the current of inductor L and generate $V_{sense}$.

At act 406, a feedback voltage may be generated based on the sense voltage and the reference voltage. For example, the feedback voltage may be generated by adding the sense voltage to the reference voltage. At act 408, it may be determined whether the feedback voltage has reached a threshold voltage. Act 408 may be performed, for example, using a comparator (which may be hysteretic in some embodiments).

At act 410, when it is determined that the feedback voltage has reached the threshold voltage, the reference voltage may be varied by reducing the absolute value of the sense voltage to a value different than zero. This may be performed, for example, by operating DC converter 100 in the partial reset mode.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

What is claimed is:

1. A method for controlling a reference voltage, the method comprising:
   generating the reference voltage with a buck converter;
   sensing a reference current flowing through the buck converter by generating a sense voltage;
   generating a feedback voltage based on the reference voltage and the sense voltage;
   determining, by a comparator that receives the feedback voltage and a threshold voltage, whether the feedback voltage exceeds the threshold voltage, the comparator generating a comparison voltage identifying whether the feedback voltage exceeds the threshold voltage;
   in response to determining that the feedback voltage exceeds the threshold voltage, setting, by a reset controller, an absolute value of the sense voltage to a reset value;
   determining, by a steady state detector, whether the reference voltage is in a steady state or in a transient period; and
   when it is determined by the steady state detector that the reference voltage is in the transient period, the reset controller sets the reset value to a first value, and, when it is determined by the steady state detector that the reference voltage is in the steady state, the reset controller sets the reset value to a second value different from the first value.

2. The method of claim 1, wherein generating the sense voltage comprises generating the sense voltage across a first capacitor.

3. The method of claim 2, wherein reducing the absolute value of the sense voltage to the reset value comprises redistributing a fraction of an electric charge stored in the first capacitor to a second capacitor.

4. The method of claim 3, wherein redistributing the fraction of the electric charge stored in the first capacitor to the second capacitor comprises redistributing approximately half of the electric charge stored in the first capacitor to the second capacitor.

5. The method of claim 3, wherein redistributing the fraction of the electric charge stored in the first capacitor to the second capacitor comprises activating a switch coupled between the first capacitor and the second capacitor.

6. The method of claim 1, wherein the first value is different from zero and the second value is approximately equal to zero.

7. The method of claim 1, further comprising: when it is determined that the reference voltage is in the transient period, reducing the absolute value of the sense voltage to the first value different from zero and, when it is determined that the reference voltage is in the steady state, reducing the absolute value of the sense voltage to zero.

8. The method of claim 1, wherein generating the feedback voltage based on the reference voltage and the sense voltage comprises generating the feedback voltage by adding the sense voltage with the reference voltage.

9. The method of claim 1, wherein the steady state detector compares the reference voltage to a predefined value.

10. The method of claim 9, wherein the steady state detector determines whether the reference voltage is within a predefined range of the predefined value.

11. A DC-DC converter comprising:
    a buck converter configured to generate a reference voltage; and
    control circuitry configured to:
       sense a reference current flowing through the buck converter by generating a sense voltage;
       generate a feedback voltage based on the reference voltage and the sense voltage;
       determine, by a comparator that receives the feedback voltage and a threshold voltage, whether the feedback voltage exceeds the threshold voltage, the comparator being configured to generate a comparison voltage identifying whether the feedback voltage exceeds the threshold voltage;
       in response to determining that the feedback voltage exceeds the threshold voltage, setting, by a reset controller, an absolute value of the sense voltage to a reset value;
       determine, by a steady state detector, whether the reference voltage is in a steady state or in a transient period, and
       when it is determined by the steady state detector that the reference voltage is in the transient period, the reset controller sets the reset value to a first value, and, when it is determined that the reference voltage is in the steady state, the reset controller sets the reset value to a second value different from the first value.

12. The DC-DC converter of claim 11, wherein the control circuitry comprises a first capacitor and is configured to generate the sense voltage across the first capacitor.

13. The DC-DC converter of claim 12, wherein the control circuitry comprises a second capacitor and is configured to reduce the absolute value of the sense voltage to the first value different from zero at least in part by redistributing a fraction of an electric charge stored in the first capacitor to the second capacitor.

14. The DC-DC converter of claim 11, wherein the first value is different from zero and the second value is approximately equal to zero.

15. A DC-DC converter comprising:
    a buck converter;
    a first capacitor coupled to the buck converter;
    a second capacitor coupled to the first capacitor through a first switch;
    a second switch in parallel with the second capacitor;
    a first comparator comprising:
       a first input terminal configured to receive a threshold voltage;
       a second input terminal coupled to the first capacitor; and
       an output terminal;
    reset circuitry coupled to the output terminal of the first comparator and to the first switch; and a steady state detector configured to determine whether the buck converter is in a steady state or in a transient period, wherein the reset circuitry is configured to control the first and second switches based at least in part on the determination of whether the buck converter is in the steady state or in the transient period.

16. The DC-DC converter of claim 15, wherein the reset circuitry is configured to close the second switch in response to a determination that the buck converter is in the steady state.

17. The DC-DC converter of claim 16, wherein, when the second switch is closed, the second switch shorts the second capacitor.

18. The DC-DC converter of claim 16, wherein the reset circuitry is configured to open the second switch in response to a determination that the buck converter is in the transient period.

19. The DC-DC converter of claim 15, wherein the steady state detector comprises a second comparator for comparing an output of the buck converter to a predefined value.

20. The DC-DC converter of claim 15, wherein the first and second capacitors have substantially equal capacitances.

21. The DC-DC converter of claim 15, wherein the output terminal of the first comparator is coupled to a control terminal of the buck converter.

* * * * *